UNITED STATES PATENT OFFICE.

ALBERT E. SMITH AND JOSEPH K. MILLIKEN, OF DIGHTON, MASSACHUSETTS.

PROCESS OF MERCERIZING.

No. 889,861.  Specification of Letters Patent.  Patented June 2, 1908.

Application filed October 22, 1906. Serial No. 339,985. (Specimens.)

*To all whom it may concern:*

Be it known that we, ALBERT E. SMITH and JOSEPH K. MILLIKEN, citizens of the United States, residing at Dighton, in the county of Bristol and State of Massachusetts, have invented certain new and useful Improvements in Processes of Mercerizing Fibrous Cellulose Materials, of which the following is a specification.

We have discovered that a mercerized product of superior luster, strength and transparence may be produced by subjecting fibrous cellulose materials to the action of a crude solution of viscose, either before or during the ordinary process of mercerization by an alkali solution.

For the preparation of the crude viscose solution 4 ounces of cotton wool are treated for twenty-four hours with 500 cc. of an aqueous sodium hydroxid solution of 21° Bé. 2 ounces of carbon bisulfid are then added and thoroughly mixed in and the mixture is allowed to stand in a tight receptacle for four hours. The resulting gum is dissolved by covering it with water and allowing it to stand twelve hours and enough water is then added to make 2 gallons of the solution. This constitutes our solution of crude viscose.

In the preferred mode of procedure, equal parts of the crude viscose solution and of an aqueous sodium hydroxid solution having a density of 45° Tw. are mixed. The cellulose fiber, yarn or fabric, in a stretched condition, is subjected to the action of the mixture for, say three minutes, and is then mercerized as usual, for example by treating it with an aqueous sodium hydroxid solution of 70° Tw. It is then washed with water and neutralized by a dilute acid solution.

In the alternative mode of procedure, one part of the crude viscose solution is mixed with two parts of the ordinary mercerizing solution, to wit an aqueous sodium hydroxid solution of 70° Tw. and the mixture is employed as a mercerizing reagent, in place of the simple alkali bath, the goods being treated in a stretched condition, washed and neutralized.

The improved physical results effected by this process are believed to be due to the extreme hydration of the cellulose fiber, due to the action of the concentrated alkali on the cellulose in the presence of the crude viscose, the hydrate groups in viscose being in a very active chemical condition and the crude viscose solution containing, as byproducts, trithio-carbonates and alkali-thiocarbonates in excess of the amount required to retain the viscose in solution. The carbon bisulfid in the crude viscose solution may also act upon the cellulose to form thiocarbonates.

We claim:

1. In the process of mercerizing fibrous cellulose materials, treating the unmercerized material with the crude solution produced by reacting on cellulose with an alkali and carbon bisulfid, and with an alkali.

2. In the process of mercerizing fibrous cellulose materials, treating the unmercerized material with a crude viscose solution and with an alkali.

3. In the process of mercerizing fibrous cellulose materials, treating the material successively with a crude solution of viscose and with an alkali.

In testimony whereof, we affix our signatures in presence of two witnesses.

ALBERT E. SMITH.
JOSEPH K. MILLIKEN.

Witnesses:
JOHN A. LEWIS,
CHAS. R. BRIGGS.